(No Model.)

B. F. SWEET.
COMBINED BRACE AND BRAKE SUPPORT FOR VEHICLES.

No. 516,283. Patented Mar. 13, 1894.

Witnesses—
E. M. Albee
Heman Miller

Inventor—
Benjamin F. Sweet.
By G. H. Albee, his Atty.

UNITED STATES PATENT OFFICE.

BENJAMIN F. SWEET, OF FOND DU LAC, WISCONSIN.

COMBINED BRACE AND BRAKE-SUPPORT FOR VEHICLES.

SPECIFICATION forming part of Letters Patent No. 516,283, dated March 13, 1894.

Application filed November 25, 1893. Serial No. 492,006. (No model.)

*To all whom it may concern:*

Be it known that I, BENJAMIN F. SWEET, a citizen of the United States, residing at Fond du Lac, in the county of Fond du Lac and State of Wisconsin, have invented certain new and useful Improvements in Vehicle Braces and Brakes; and I do declare that the following is a full, clear, and exact description of the invention, which will enable others skilled in the art to which it appertains to use the same.

My invention relates to the application upon four wheeled road vehicles having a body and springs of a brace of novel construction extending from the rear axle, in a forward direction, to the under side of the vehicle body, and the objects of the improvement are, to strengthen the vehicle, to prevent a longitudinal movement of the body upon the axle, and to provide a support for a brake shaft which will have a less vertical movement than the body will, when a load is placed upon the springs. These objects I attain in the manner hereinafter described and as illustrated in the accompanying drawings, in which—

Figure 1:
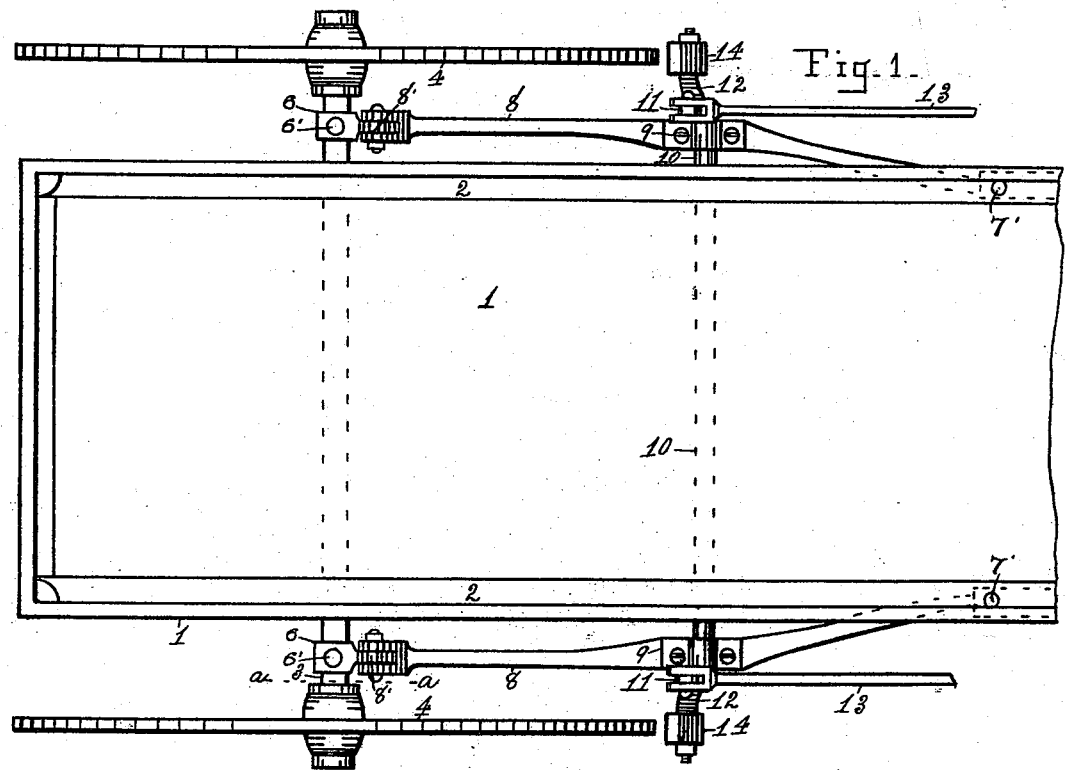
Figure 2:
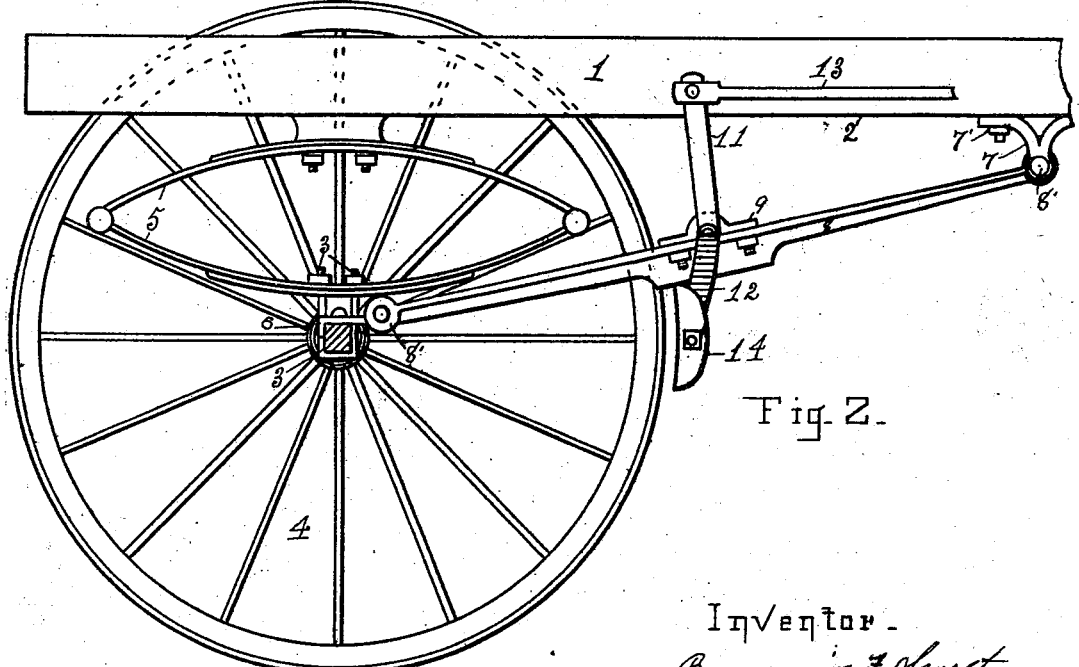

Figure 1 is a plan view of a portion of the rear end of a vehicle having my improvement applied to it; Fig. 2, a side view of Fig. 1 having the nearest wheel removed and the axle cut upon the line a, a, of Fig. 1.

Similar figures of reference indicate like parts in both views.

1 indicates the vehicle body; 2, the bottom rail thereof; 3, the rear axle; 3', clip bolts which connect the body with the axle; 4, the rear wheels; 5, the vehicle springs; 6, arms upon the axle; 6', bolts for securing said arms to the axle; 7, brackets depending from the body; 7', bolts for connecting said brackets to the body; 8, stay braces connecting axle and body; 8', knuckle joint connections between the axle and body; 9, journal boxes upon said braces; 10, a brake shaft; 11, the upper arm of the brake shaft; 12, the lower arm of said shaft; 13, rods extending from the upper arm to the driver for the operation of the brake; 14, the brake shoes.

As will be seen from the drawings, the vehicle body is supported upon springs, 5, which springs are connected to the axle with the clip bolts 3', and the body is supported upon the springs, and connected to them in a usual and well known manner. The springs may be the common end springs as shown, or any other kind suitable for the particular style of vehicle, which may be desired. Attached to the axle near each shoulder of its journals upon opposite sides of the body are arms 6, and upon the lower side of the body, at each side thereof, at a distance forward of the axle corresponding nearly with the diameter of the wheels, are secured the brackets 7. A stay brace 8, connects each bracket with a corresponding arm upon the axle by means of knuckle joints, the pins 8 of said joints passing through the spade handle and thimble parts of said joints in a horizontal direction, whereby a vertical movement of the vehicle body is permitted, while preserving the strengthening quality of said stay braces and preventing a longitudinal movement of the body upon the axle.

It may be remarked that the arms 6 may be either in, or outside of the vehicle springs, as the particular construction of the vehicle may require.

Upon said stay braces, intermediate their ends, and a little forward of the wheels, are journal boxes 9, for carrying the brake shaft 10. This shaft, its crank arms and brake shoes, as herein shown, are of a usual and well known type, the shaft having arms 11 extending upward for connection by means of the rod 13 with the usual lever to be operated by the driver of the vehicle, and having also, arms 12 extending outward and downward and which are provided with the brake shoes 14.

In order that the normal position of the brake shoes may be out of contact with the wheel tires, the brake shaft is journaled a little forward of the wheel rim, and the arms 12 are bent slightly backward in addition to their downward bend, which bends in connection with the weight of the brake shoes, throws said shoes, when hanging naturally, away from the wheels.

No claim is made to a vehicle brake, or to the above feature of its construction, as both are well known.

The above described position for the brake shaft requires said stay braces to be of a length exceeding the diameter of the wheel for the purpose of diminishing to the desired degree, which is approximately one half, the vertical movement of the brake shoes, as compared with that of the vehicle body, consequent upon its being loaded or light, said movement of the brake shoes being in an inverse ratio with the distance upon the stay braces, of the brake shaft from the aforesaid knuckle joints at the forward end of said braces.

Having described my invention, what I claim, and desire to secure by Letters Patent, is—

1. The combination with a wheeled road vehicle provided with a body and springs, of two stay braces extending in a forward direction from said axle and having intermediate their ends at approximately an equal distance from each of said ends a bearing suitably arranged for supporting a brake shaft, said braces being arranged upon opposite sides of said body, one end of each brace being jointed to an arm extending from near the shoulder of one of the axle journals, and the other end jointed to a bracket depending from said body, said parts being arranged and operating to prevent longitudinal movement of the body upon the axle, to allow a vertical vibration of the body upon said springs, and a vertical movement of said bearing of approximately one half of the distance of said vibration of the body substantially as described.

2. The combination with a wheeled road vehicle provided with a body, springs and a brake, of two stay braces extending in a forward direction from said axle and having intermediate their ends at approximately an equal distance from each of said ends a bearing suitably arranged for supporting said brake shaft, said braces being arranged upon opposite sides of said body, one end of each brace being jointed to an arm extending from near the shoulder of one of the axle journals, and the other end jointed to a bracket depending from said body, said parts being arranged and operating to prevent longitudinal movement of the body upon the axle, to allow a vertical vibration of the body upon said springs, and a vertical movement of said brake shaft of approximately one half of the distance of said vibration of the body and also, to permit the shoes of said brake to be applied to the wheels of said vehicle, substantially as set forth.

BENJ. F. SWEET.

Witnesses:
N. C. GIFFIN,
WALDO SWEET.